United States Patent
Culbertson et al.

[19]

[11] Patent Number: 6,011,957
[45] Date of Patent: Jan. 4, 2000

[54] POLARITY CHANGE BOX FOR RADIO TRANSMITTER RECEIVER

[75] Inventors: David L. Culbertson, New London, Conn.; Trevor Barron, Charlestown, R.I.

[73] Assignee: The United States of America as represented by the Secretary of the Navy, Washington, D.C.

[21] Appl. No.: 08/845,265

[22] Filed: Apr. 24, 1997

[51] Int. Cl.[7] ........................................ H04B 1/38
[52] U.S. Cl. .......................... 455/73; 455/115; 455/423; 455/67.4; 324/133
[58] Field of Search ................... 455/67.1, 67.4, 455/115, 226.1, 423, 73; 324/66, 133, 158.1, 538; 379/6, 27, 29, 30, 32, 2

[56] References Cited

U.S. PATENT DOCUMENTS

| | | | |
|---|---|---|---|
| 5,471,649 | 11/1995 | Rees et al. | 455/423 |
| 5,502,375 | 3/1996 | Marek | 324/133 |
| 5,608,328 | 3/1997 | Sanderson | 324/133 |
| 5,613,226 | 3/1997 | Kanami | 455/115 |

Primary Examiner—Nguyen Vo
Assistant Examiner—Sam Bhattacharya
Attorney, Agent, or Firm—Michael J. McGowan; Robert W. Gauthier; Prithvi C. Lall

[57] ABSTRACT

A polarity change box for selectively reversing the polarity of balanced signals and for simultaneously monitoring control and data signals while injecting a test signal. The box includes an input connector and an output connector for receiving and transmitting signals, respectively, and a plurality of circuits for transmitting balanced signals. Each circuit includes a pair of input leads from the input connector and a pair of output leads from the output connector which are electrically connected to a double pole double throw switch. Test points are electrically connected to each output lead. The switch may be selectively positioned in a "normal", "inject", or "reverse" position. In the "normal" position, the first and second input leads are electrically connected to the first and second output leads, respectively, and the output signal has the same polarity as the input signal. In the "inject" position, the switch opens the circuit allowing a test signal to be injected. In the "reverse" position, the circuit reverses the polarity of the input signal by electrically connecting the first and second input leads to the second and first output leads, respectively.

13 Claims, 3 Drawing Sheets

6,011,957

POLARITY CHANGE BOX FOR RADIO TRANSMITTER RECEIVER

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION (1) Field of the Invention

This invention relates generally to electronic equipment test apparatus. More particularly, the present invention relates to apparatus for testing communications equipment such as a radio transmitter/receiver.

(2) Description of the Prior Art

During initial installation of radio transmitter/receiver equipment at a communications station, the correct polarity of balanced control and data signals is often not known. Currently, the proper polarity of such signals is obtained by repeatedly changing multiple cable connections until the communications equipment is operating properly. This troubleshooting technique is laborious, time consuming and prone to error.

Currently available apparatus allow control and data signals to be monitored at a patch panel test point. However, it is often desirable to inject test signals while monitoring the control and data signals of the communications equipment. There is no method or apparatus currently available which will simultaneously inject test signals and monitor the control and data signals.

Thus, what is needed is a device for testing communications equipment such as a radio transmitter/receiver which allows for selectively reversing the polarity of balanced signals as well as simultaneously injecting test signals and monitoring data and control signals.

SUMMARY OF THE INVENTION

Accordingly, it is a general purpose and object of the invention to provide a new and improved test apparatus for use with a radio transmitter/receiver having a patch panel.

It is another object of the invention to provide a new and improved test apparatus for selectively reversing the polarity of balanced signals.

It is still another object of the invention to provide a new and improved test apparatus for simultaneously injecting test signals and monitoring data and control signals.

These and other objects and advantages of the invention will become readily apparent from the drawings and specification. Briefly stated, the invention in a preferred form is a polarity change box for generating and modifying balanced signals which are transmitted and received by a radio transmitter/receiver having a patch panel. The box comprises a housing, an input connector and an output connector for receiving and transmitting signals to the patch panel, respectively. The box further includes a plurality of circuits wherein each circuit comprises a pair of input leads from the input connector and a pair of output leads from the output connector which are electrically connected to a double pole double throw switch.

The double pole double throw switch may be selectively positioned in a "normal", "inject", or "reverse" position. In the "normal" position, the first and second input conductors are electrically connected to the first and second output conductors, respectively. Consequently, the signal that is transmitted from the output connector has the same polarity as the signal that is received by the input connector. In the "inject" position, the input leads are not electrically connected to the output leads. Therefore, the switch prevents the signal which is received by the input connector from being transmitted by the output connector. In the "reverse" position, the first and second input conductors are electrically connected to the second and first output conductors, respectively. Consequently, the signal that is transmitted from the output connector has a polarity that is opposite to that of the signal that is received by the input connector.

Test points are electrically connected to each output conductor intermediate the double pole double throw switch and the output connector. The control and data signals that are transmitted through the circuits may be monitored at the test points. Additionally, a known signal may injected into a circuit at the associated test point.

BRIEF DESCRIPTION OF THE DRAWINGS

A more complete understanding of the invention and many of the attendant advantages thereto will be readily appreciated as the same becomes better understood by reference to the following detailed description when considered in conjunction with the accompanying drawings wherein like numerals designate identical or corresponding parts throughout the several views and wherein.

DESCRIPTION OF THE PREFERRED EMBODIMENT

Figure 1:
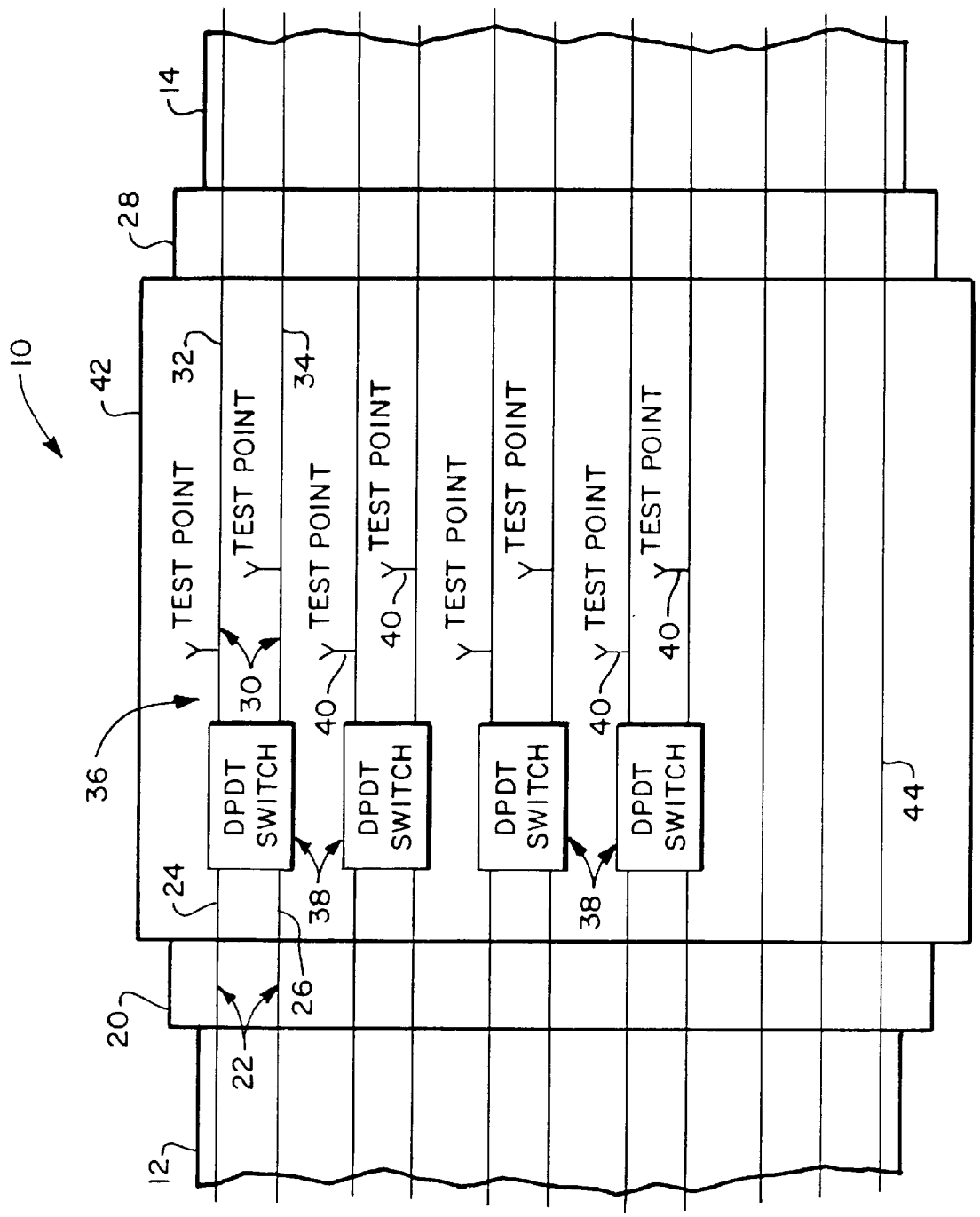
FIG. 1 is a schematic diagram of a polarity change box in accordance with the invention.

Referring now to FIG. 1, a polarity change box in accordance with the present invention is generally designated by the numeral 10. The polarity change box 10 has at least one input connector 20 and at least one output connector 28 which are connected to the patch panel of a radio transmitter/receiver (not shown) by a cable 12, 14 or the like.

Figure 2:
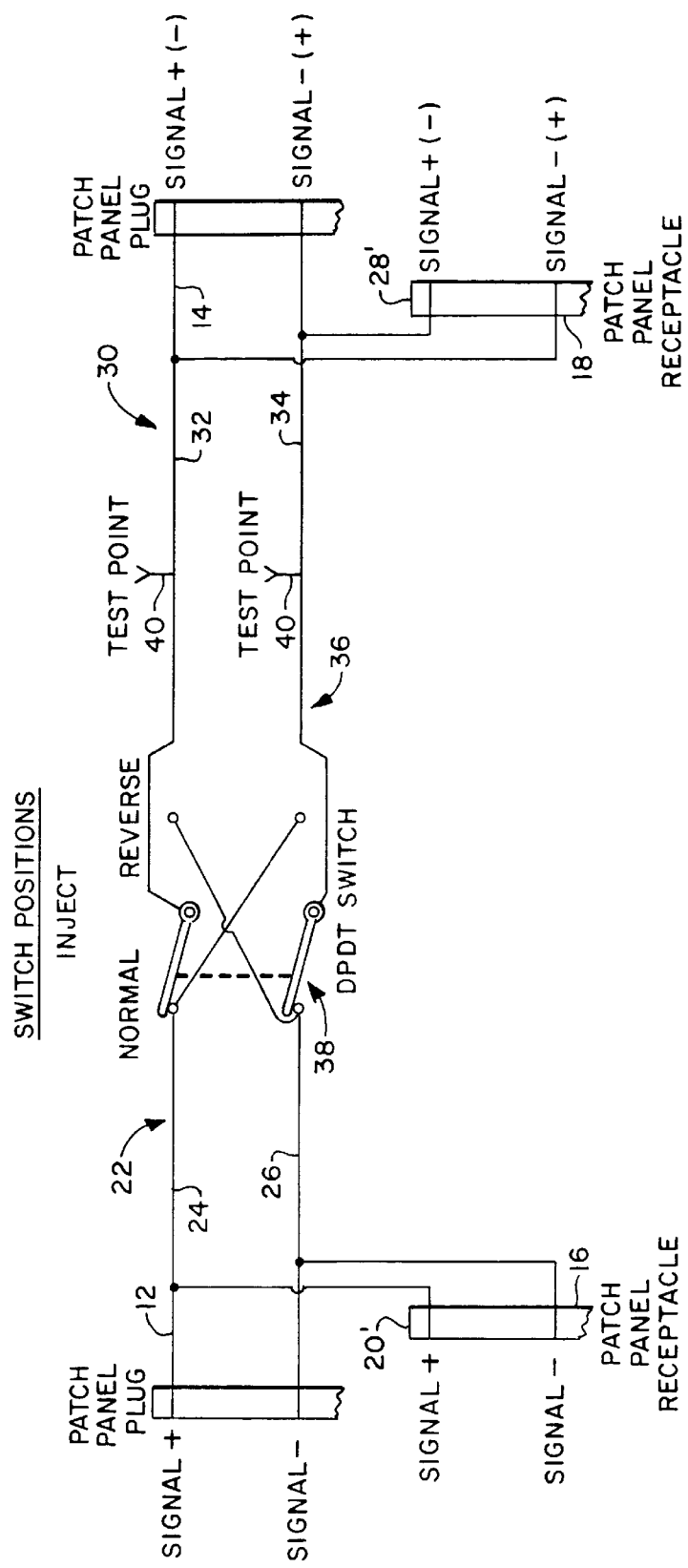
FIG. 2 is a schematic diagram of a balanced signal polarity change circuit of the polarity change box of FIG. 1.

In a preferred embodiment, the polarity change box 10 has four circuits 36 for carrying balanced signals. With reference to FIG. 2, each circuit 36 comprises one pair of input leads 22 from the input connector 20 connected to the input side of a double pole double throw switch 38 and one pair of output leads 30 from the output connector 28 connected to the output side of switch 38. Each switch 38 may be independently selectively positioned in a "normal", "inject", or "reverse" position.

Figure 3A:
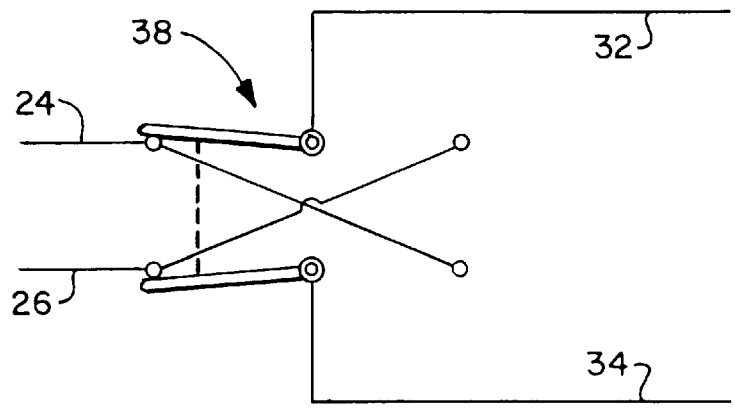
FIGS. 3a, 3b and 3c are schematic diagrams of the switch, input lead, and output lead of a polarity change box with the switch in the "normal", "inject", and "reverse" positions, respectively.
Figure 3B:
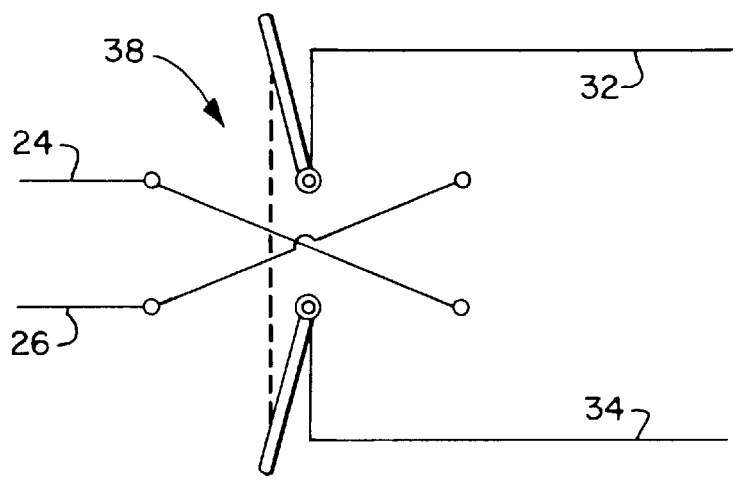
Figure 3C:
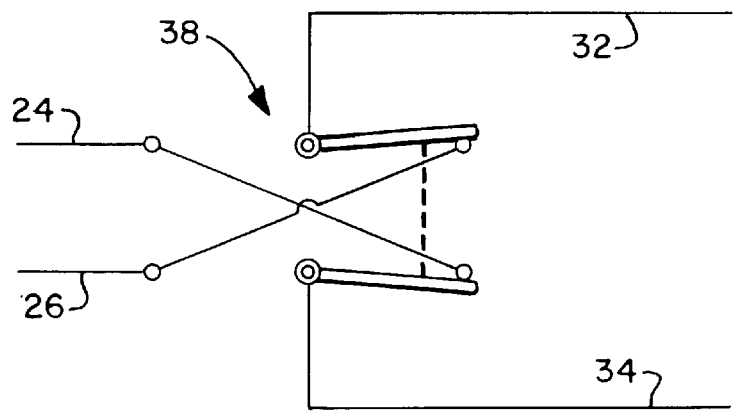

In the "normal" position, the first input conductor 24 is electrically connected to the first output conductor 32 and the second input conductor 26 is electrically connected to the second output conductor 34 (FIG. 3a). Consequently, the signal that is transmitted from the output connector 28 has the same polarity as the signal that is received by the input connector 20. In the "inject" position, the input leads 22 are not electrically connected to the output leads 30 (FIG. 3b). Therefore, switch 38 prevents the signal which is received by the input connector 20 from being transmitted by the output connector 28. In the "reverse" position, the first input conductor 24 is electrically connected to the second output conductor 34 and the second input conductor 26 is electrically connected to the first output conductor 32 (FIG. 3c). Consequently, the signal that is transmitted from the output connector 28 has a polarity that is opposite to that of the signal that is received by the input connector 20.

As shown in FIG. 2, test points 40 are electrically connected to each output conductor 32, 34 intermediate the switch 38 and the output connector 28. The control and data signals that are transmitted through the circuits 36 may be monitored at the test points 40. Additionally, a known signal may injected into a circuit 36 at the associated test point 40. Generally such signal would be injected only when the switch 38 upstream of the test point 40 is in the "inject" position.

The polarity change box 10 includes two means for connecting the box to the patch panel (FIG. 2). Input and output cables 12, 14 allow the box to be connected to the patch panel without requiring the use of the transmitter/receiver connecting cables. Input and output receptacles 16, 18 provide means for connecting and testing the transmitter/receiver through the transmitter/receiver connecting cables. Testing through the connecting cables verifies that the cables are correctly wired. In a preferred embodiment, input signals are connected to the polarity test box 10 as shown in Table 1.

TABLE 1

| Pin Number | Signal Name |
| --- | --- |
| 1 | Shield |
| 19 | Signal Ground |
| 2 | Send Data A |
| 14 | Send Data B |
| 3 | Receive Data A |
| 16 | Receive Data B |
| 4 | Request to Send A |
| 19 | Request to Send B |
| 5 | Clear to Send A |
| 13 | Clear to Send B |
| 6 | DCE Ready A |
| 22 | DCE Ready B |
| 20 | DTE Ready A |
| 23 | DTE Ready B |
| 8 | Receive Line Signal Detect A |
| 10 | Receive Line Signal Detect B |
| 24 | Transmit Signal Element Timing A (DTE) |
| 11 | Transmit Signal Element Timing B (DTE) |
| 15 | Transmit Signal Element Timing A (DCE) |
| 12 | Transmit Signal Element Timing A (DCE) |
| 17 | Receiver Signal Element Timing A |
| 9 | Receiver Signal Element Timing B |

The polarity change box 10 may also be used to monitor non-balanced data and control signals. In the embodiment shown in FIG. 1, sixteen conductors 44 carry non-balanced data and control signals. Test points 40 that are in electrical communication with each of the conductors 44 allow the signals to be monitored.

The housing 42 of the polarity test box 10 provides a framework for mounting the input and output connectors 20, 28, the switches 38, and the test points 40. In addition, the housing 42 protects the conductors 24, 26, 32, 34 and electrical connections from degradation due to environmental factors and the work environment.

The polarity change box 10 facilitates testing during initial installation and during troubleshooting of installed systems. Many data and control signal polarity combinations may be evaluated in a short period of time. Testing that might have taken hours can be performed in minutes. The switch positions are easily noted and verified, reducing error and facilitating development of test plans and procedures.

It should be appreciated mechanical hand-operated switches may be used for the double pole double throw switches. Alternatively, digital circuitry under computer control may be utilized.

While preferred embodiments have been shown and described, various modifications and substitutions may be made thereto without departing from the spirit and scope of the invention. Accordingly, it is to be understood that the present invention has been described by way of illustration and not limitation.

What is claimed is:

1. Test apparatus for use with a transmitter/receiver having a patch panel, said apparatus comprising:

first connection means connectable to the patch panel for receiving a signal from the patch panel, said first connection means comprising four pairs of input leads, each pair of input leads having first and second input conductors;

second connection means connectable to the patch panel for transmitting a signal to the patch panel, said second connection means comprising four pairs of output leads, each pair of output leads having first and second output conductors; and four double pole double throw switches, each switch selectively and respectively providing electrical communication between one of said four pairs of input leads and one of said pairs of output leads, said switch means being selectively positionable from a first position wherein said first input conductor and said first output conductor are in electrical communication and said second input conductor and said second output conductor are in electrical communication, a second position wherein said first connection means is not in electrical communication with said second connection means, and a third position wherein said first input conductor and said second output conductor are in electrical communication and said second input conductor and said first output conductor are in electrical communication.

2. The test apparatus of claim 1 further comprising a plurality of test point jacks, wherein a said test point jack is in electrical communication with said first output conductor and a said test point jack is in electrical communication with said second output conductor.

3. The test apparatus of claim 1 wherein said switch means comprises at least one double pole double throw switch.

4. The test apparatus of claim 1 wherein said first and second connection means each comprise a plug.

5. The test apparatus of claim 1 wherein said first and second connection means each comprise a plug and a receptacle.

6. A test apparatus for use with a transmitter/receiver having a patch panel, said apparatus comprising:

first connection means connectable to the patch panel for receiving a signal from the patch panel, said first connection means comprising at least one pair of input leads having first and second input conductors;

second connection means connectable to the patch panel for transmitting a signal to the patch panel, said second connection means comprising at least one pair of output leads having first and second output conductors;

switch means for selectively providing electrical communication between said first and second connection means, said switch means being selectively positionable from a first position wherein said first input conductor and said first output conductor are in electrical communication and said second input conductor and said second output conductor are in electrical communication, a second position wherein said first connection means is not in electrical communication with said second connection means, and a third position wherein said first input conductor and said second output conductor are in electrical communication and said second input conductor and said first output conductor are in electrical communication; and third and fourth connection means, a plurality of wires providing electrical communication between said third and fourth connection means, and a plurality of test point jacks, wherein a said test point jack is in electrical communication with each of said wires.

7. Test apparatus for generating and modifying balanced signals which are transmitted and received by a radio transmitter/receiver having a patch panel, wherein the signal has a polarity, said apparatus comprising:

a housing;

first connection means connectable to the patch panel for receiving a signal from the patch panel, said first connection means being mounted to the housing and comprising at least one pair of input leads disposed in the housing, said pair of outlet leads comprising first and second input conductors;

second connection means connectable to the patch panel for transmitting a signal to the patch panel, said second connection means being mounted to the housing and comprising at least one pair of output leads disposed in the housing, said pair of output leads comprising first and second output conductors; and switch means for selectively providing electrical communication between said first and second connection means, said switch means being mounted to the housing and being selectively positionable from a first position wherein said first input conductor and said first output conductor are in electrical communication and said second input conductor and said second output conductor are in electrical communication, a second position wherein said first connection means is not in electrical communication with said second connection means, and a third position wherein said first input conductor and said second output conductor are in electrical communication and said second input conductor and said first output conductor are in electrical communication;

wherein the polarity of the signal transmitted by the second connection means is the maintained as the polarity of the signal received by the first connection means by positioning said switch means in said first position, the polarity of the signal transmitted by the second connection means is reversed from the polarity of the signal received by the first connection means by positioning said switch means in said third position, and a signal received by the first connection means is interrupted by positioning said switch means at said second position.

8. The test apparatus of claim 7 wherein said switch means comprises at least one double pole double throw switch.

9. The test apparatus of claim 7 wherein said switch means comprises four double pole double throw switches, said first connection means comprises four pairs of input leads, and said second connection means comprises four pairs of output leads, wherein said first, second, third and fourth double pole double throw switches selectively provide electrical communication between said first, second, third and fourth pairs of input leads and said first, second, third and fourth pairs of output leads, respectively.

10. The test apparatus of claim 9 wherein said first and second connection means each comprise a plug.

11. The test apparatus of claim 9 wherein said first and second connection means each comprise a plug and a receptacle.

12. The test apparatus of claim 11 further comprising a plurality of test point jacks mounted to the housing, wherein a said test point jack is in electrical communication with said first output conductor and a said test point jack is in electrical communication with said second output conductor, wherein said test point jacks may be used to monitor the signal or insert a signal.

13. The test apparatus of claim 11 further comprising third and fourth connection means, a plurality of wires providing electrical communication between said third and fourth connection means, and a plurality of test point jacks, wherein a said test point jack is in electrical communication with each of said wires.

* * * * *